(12) United States Patent
Sunahara et al.

(10) Patent No.: US 10,569,765 B2
(45) Date of Patent: Feb. 25, 2020

(54) VEHICLE BEHAVIOR CONTROL DEVICE

(71) Applicant: MAZDA MOTOR CORPORATION, Hiroshima (JP)

(72) Inventors: Osamu Sunahara, Hiroshima (JP); Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 210 days.

(21) Appl. No.: 15/341,634

(22) Filed: Nov. 2, 2016

(65) Prior Publication Data
US 2017/0129479 A1    May 11, 2017

(30) Foreign Application Priority Data

Nov. 6, 2015    (JP) .................................. 2015-218637

(51) Int. Cl.
    *B60W 30/045*    (2012.01)
    *B62D 15/02*    (2006.01)

(52) U.S. Cl.
    CPC ......... *B60W 30/045* (2013.01); *B62D 15/021* (2013.01); *B60W 2520/10* (2013.01); *B60W 2540/10* (2013.01)

(58) Field of Classification Search
    None
    See application file for complete search history.

(56) References Cited

U.S. PATENT DOCUMENTS

| | | | |
|---|---|---|---|
| 6,212,465 B1 * | 4/2001 | Sielagoski | ......... B60K 31/0066 180/170 |
| 8,433,493 B2 | 4/2013 | Takahashi et al. | |
| 8,538,653 B2 | 9/2013 | Miyajima et al. | |
| 8,676,464 B2 | 3/2014 | Shimura et al. | |
| 8,880,293 B2 | 11/2014 | Hirao et al. | |

(Continued)

FOREIGN PATENT DOCUMENTS

| | | |
|---|---|---|
| EP | 2 712 780 A1 | 4/2014 |
| EP | 2 712 782 A1 | 4/2014 |

(Continued)

OTHER PUBLICATIONS

Ishimoto, Takeshi, Machine translation of JP-2005145143-A, Jun. 2005, espacenet.com (Year: 2005).*

(Continued)

*Primary Examiner* — David P. Merlino
(74) *Attorney, Agent, or Firm* — Studebaker & Brackett PC (57) ABSTRACT

A PCM (14) for controlling a behavior of a vehicle (1) having steerable front road wheels is configured to perform a control to reduce a driving force for the vehicle (1) according to a yaw rate-related quantity (e.g., steering speed) of the vehicle (1). Specifically, the PCM (14) is configured, after reducing the driving force in response to a change in the yaw rate-related quantity and according to the yaw rate-related quantity being changing, to increase the driving force so as to restore a value of the driving force before the reduction, and the PCM (14) is operable, when increasing the driving force so as to restore a value of the driving force before the reduction, to change a change rate during the increasing of the driving force, according to a magnitude of the yaw rate-related quantity thereduring.

8 Claims, 6 Drawing Sheets

(56) References Cited

U.S. PATENT DOCUMENTS

| | | | |
|---|---|---|---|
| 8,977,464 B1 | 3/2015 | Takahashi et al. | |
| 8,989,981 B2 | 3/2015 | Yamakado et al. | |
| 9,043,116 B2 | 5/2015 | Takahashi et al. | |
| 9,086,427 B2 | 7/2015 | Maeda et al. | |
| 9,139,107 B2 | 9/2015 | Kageyama et al. | |
| 9,211,875 B2 | 12/2015 | Harada | |
| 9,296,374 B2 | 3/2016 | Yamakado et al. | |
| 9,352,747 B2 | 5/2016 | Nagatsuka et al. | |
| 2007/0021875 A1* | 1/2007 | Naik | B60W 30/045 701/1 |
| 2007/0106445 A1* | 5/2007 | Suzuki | B60K 31/0066 701/70 |
| 2011/0202250 A1 | 8/2011 | Miyajima et al. | |
| 2012/0053791 A1 | 3/2012 | Harada | |
| 2012/0209489 A1* | 8/2012 | Saito | B60W 30/143 701/70 |
| 2012/0277965 A1 | 11/2012 | Takahashi et al. | |
| 2012/0316744 A1 | 12/2012 | Shimura et al. | |
| 2013/0041541 A1 | 2/2013 | Kageyama et al. | |
| 2013/0079988 A1 | 3/2013 | Hirao et al. | |
| 2013/0345901 A1 | 12/2013 | Maeda et al. | |
| 2014/0222309 A1 | 8/2014 | Yamakado et al. | |
| 2015/0094924 A1 | 4/2015 | Takahashi et al. | |
| 2015/0094927 A1 | 4/2015 | Takahashi et al. | |
| 2015/0120121 A1* | 4/2015 | Nobumoto | B60W 30/045 701/22 |
| 2015/0166025 A1 | 6/2015 | Nagatsuka et al. | |
| 2015/0239442 A1 | 8/2015 | Yamakado et al. | |
| 2015/0298696 A1 | 10/2015 | Nagatsuka et al. | |
| 2015/0321669 A1 | 11/2015 | Inou et al. | |
| 2015/0367852 A1 | 12/2015 | Nagatsuka et al. | |
| 2016/0059852 A1 | 3/2016 | Yamakado et al. | |
| 2016/0244038 A1 | 8/2016 | Yamakado et al. | |
| 2016/0264135 A1* | 9/2016 | Yamakado | B60W 30/045 |

FOREIGN PATENT DOCUMENTS

| | | | | |
|---|---|---|---|---|
| JP | 2005145143 A | * | 6/2005 | |
| JP | 2008057391 A | * | 3/2008 | |
| JP | 2011-088576 A | | 5/2011 | |
| JP | 2014-166014 A | | 9/2014 | |
| JP | 2014166014 A | * | 9/2014 | |
| JP | 2015-085819 A | | 5/2015 | |
| JP | 2015-085820 A | | 5/2015 | |
| JP | 2015-085823 A | | 5/2015 | |
| JP | 2015-089251 A | | 5/2015 | |
| JP | 2015-089252 A | | 5/2015 | |
| JP | 2015-182752 A | | 10/2015 | |
| JP | 2016-039750 A | | 3/2016 | |
| JP | 2016-039751 A | | 3/2016 | |
| WO | 2012/042935 A1 | | 4/2012 | |
| WO | 2014/054432 A1 | | 4/2014 | |
| WO | 2014/119171 A1 | | 8/2014 | |
| WO | 2016/020718 A1 | | 2/2016 | |

OTHER PUBLICATIONS

Okubo, Yoshinao, Machine translation of JP-2008057391-A, Mar. 2008, espacenet.com (Year: 2008).*

Nobemoto Hidetoshi, Machine translation of JP-2014166014-A, Sep. 2014, espacenet.com (Year: 2014).*

JP Office Action dated Jul. 31, 2017, from corresponding JP Appl No. 2015-218638, 4 pp.

* cited by examiner

FIG.6B Steering angle [deg]

FIG.6C Steering speed [deg/s]

FIG.6D Additional deceleration [m/s²]

FIG.6E Torque reduction amount [Nm]

FIG.6F Final target torque [Nm]

FIG.6G Actual yaw rate [rad/s]

VEHICLE BEHAVIOR CONTROL DEVICE

BACKGROUND OF THE INVENTION

Field of the Invention

The present invention relates to a vehicle behavior control device, and more particularly to a vehicle behavior control device for controlling a behavior of a vehicle having steerable front road wheels.

Description of Related Art

Heretofore, there has been known a control system capable of, in a situation where a behavior of a vehicle becomes unstable due to road wheel slip or the like, controlling the vehicle behavior to enable a safe traveling (e.g., an antiskid brake system). Specifically, there has been known a control system operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust a load to be applied to front road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see Patent Document 1: JP 2011-88576A, for example).

Further, there has been proposed a vehicle behavior control device operable to reduce a driving force for a vehicle according to a yaw rate-related quantity corresponding to a steering wheel operation of a driver (e.g., yaw acceleration), thereby making it possible to quickly generate a vehicle deceleration in response to start of the steering wheel operation by the driver and thus quickly apply a sufficient load to front road wheels as steerable road wheels (see Patent Document 2: JP 2014-166014A, for example).

In this vehicle behavior control device, in response to start of the steering wheel operation, a load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsiveness to a turning operation of a steering wheel. This makes it possible to realize a vehicle behavior as intended by the driver.

BRIEF SUMMARY OF THE INVENTION

Technical Problem

The above Patent Document 2 discloses a technique of, after performing control to reduce the driving force for the vehicle according to the steering wheel operation of the driver, increasing the driving force so as to restore a value of the driving force before the reduction. In this technique, there occurs a situation where, when the driving force is increased, the driver can be given a feeling of a discontinuous change in reaction force to the steering wheel (i.e., a steering load of the steering wheel which is felt by the driver during steering). In particular, when the driver operates the steering wheel at a relatively slow steering speed, the driver tends to be given a feeling that the reaction force to the steering wheel changes due to an increase in the driving force.

The present invention has been made to solve the above conventional problem, and an object thereof is to provide a vehicle behavior control device capable of, after reducing a driving force for a vehicle according to a yaw rate-related quantity which is related to a yaw rate of the vehicle, increasing the driving force at an adequate change rate, thereby making it possible to suppress the occurrence of a situation where a driver is given a feeling that a reaction force to a steering wheel discontinuously changes during steering.

Solution to Problem

In order to achieve the above object, the present invention provides a vehicle behavior control device for controlling a behavior of a vehicle having steerable front road wheels, comprising a controller configured to perform a control to reduce a driving force for the vehicle according to a yaw rate-related quantity which is related to a yaw rate of the vehicle, wherein the controller is configured to: increasing the driving force so as to restore a value of the driving force before the reduction, after the driving force is reduced in response to a change in the yaw rate-related quantity and according to the yaw rate-related quantity being changing; and changing a change rate during the increasing of the driving force according to a magnitude of the yaw rate-related quantity, when the driving force is increased so as to restore the value of the driving force before the reduction.

In the vehicle behavior control device of the present invention having the above feature, during the control of stopping of the reduction of the driving force according to the yaw rate-related quantity and increasing the driving force so as to restore an original value of the driving force, the driving force is increased at an adequate change rate according to the yaw rate-related quantity, so that it becomes possible to suppress the occurrence of a situation where a driver is given a feeling that a reaction force to a steering wheel discontinuously changes during steering.

Preferably, in the vehicle behavior control device of the present invention, the controller is configured to reduce the change rate during the increasing of the driving force to a smaller value, as the yaw rate-related quantity becomes smaller.

According to this feature, it becomes possible to, even when the yaw rate-related quantity is relatively low (slow), effectively suppress the occurrence of the situation where a driver is given a feeling that a reaction force to a steering wheel changes during steering.

Preferably, in the vehicle behavior control device of the present invention, when a steering wheel of the vehicle is turned and then turned back, the controller is configured to change the change rate during the increasing of the driving force, according to a magnitude of the yaw rate-related quantity during the turning-back of the steering wheel.

According to this feature, the change rate during the increasing of the driving force is changed according to a magnitude of the yaw rate-related quantity during the operation of turning back the steering wheel, so that it becomes possible to effectively suppress the occurrence of a situation where a driver is given a feeling that a reaction force to the steering wheel changes during the turning-back of the steering wheel.

Preferably, in the vehicle behavior control device of the present invention, the controller is configured to change the change rate within a predetermined range, during the increasing of the driving force.

According to this feature, the change rate during the increasing of the driving force is restricted using the given range, so that it becomes possible to ensure combustion stability and exhaust gas emission performance of an engine, and ensure drivability.

Preferably, in the vehicle behavior control device of the present invention, when a steering wheel angle is increasing and the yaw rate-related quantity is increasing, the controller is configured to reduce the driving force according to the yaw rate-related quantity being increasing, and, when the steering wheel angle decreases or becomes constant, the controller is configured to increase the driving force so as to restore a value of the driving force before the reduction.

According to this feature, it becomes possible to quickly apply, to the vehicle, a degree of deceleration according to a steering wheel operation by a driver, to quickly apply a load to the front road wheels and increase a cornering force of the front road wheels, thereby providing an improved responsiveness to a steering wheel operation. This makes it possible to accurately realize a vehicle behavior as intended by the driver.

The vehicle behavior control device of the present invention is capable of, after reducing the driving force according to the yaw rate-related quantity, increasing the driving force at an adequate change rate, thereby making it possible to suppress the occurrence of the situation where a driver is given a feeling that a reaction force to a steering wheel discontinuously changes during steering.

BRIEF DESCRIPTION OF THE SEVERAL VIEWS OF THE DRAWINGS

FIGS. 6A to 6G are diagrams depicting a temporal change of each parameter pertaining to engine control to be performed by the vehicle behavior control device according to this embodiment during turning of a vehicle equipped with the vehicle behavior control device, wherein.

DETAILED DESCRIPTION OF THE INVENTION

With reference to the accompanying drawings, a vehicle behavior control device according to one embodiment of the present invention will now be described.

Figure 1:
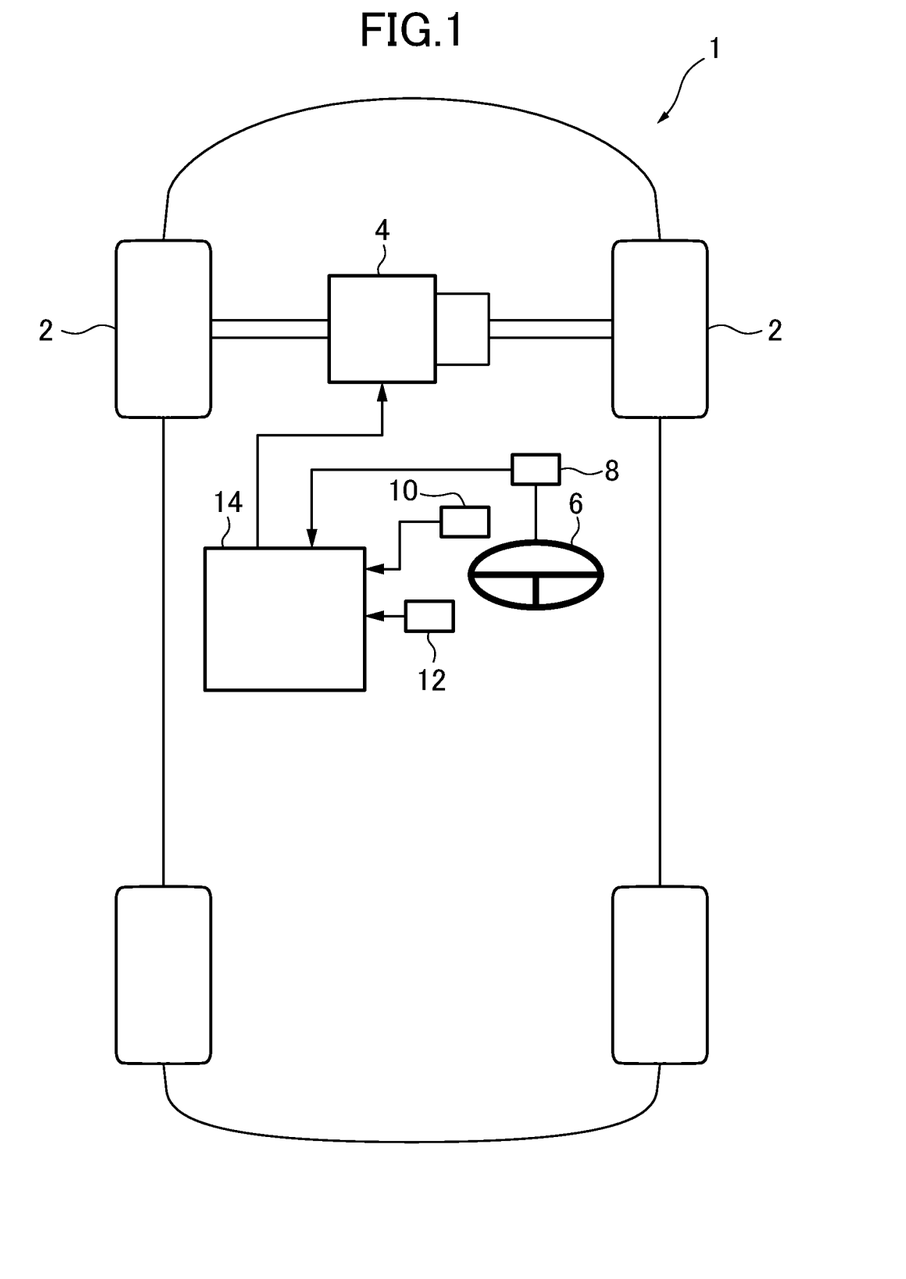
FIG. 1 is a block diagram depicting an entire configuration of a vehicle equipped with a vehicle behavior control device according to one embodiment of the present invention.

First of all, with reference to FIG. 1, a vehicle equipped with the vehicle behavior control device according to this embodiment will be described. FIG. 1 is a block diagram depicting an entire configuration of the vehicle equipped with the vehicle behavior control device according to this embodiment.

In FIG. 1, the reference sign 1 denotes the vehicle equipped with the vehicle behavior control device according to this embodiment. A vehicle body of the vehicle 1 has a front portion on which an engine 4 for driving drive road wheels (in the vehicle depicted in FIG. 1, right and left front road wheels 2) is mounted. The engine 4 is an internal combustion engine such as a gasoline engine or a diesel engine.

The vehicle 1 has: a steering wheel angle sensor 8 for detecting a rotational angle of a steering wheel 6 (steering wheel angle); an accelerator position sensor 10 for detecting an amount of depression of an accelerator pedal (accelerator position); and a vehicle speed sensor 12 for detecting a vehicle speed. Each of the above sensors is operable to output a detection value to a PCM (Power-train Control Module) 14.

Figure 2:
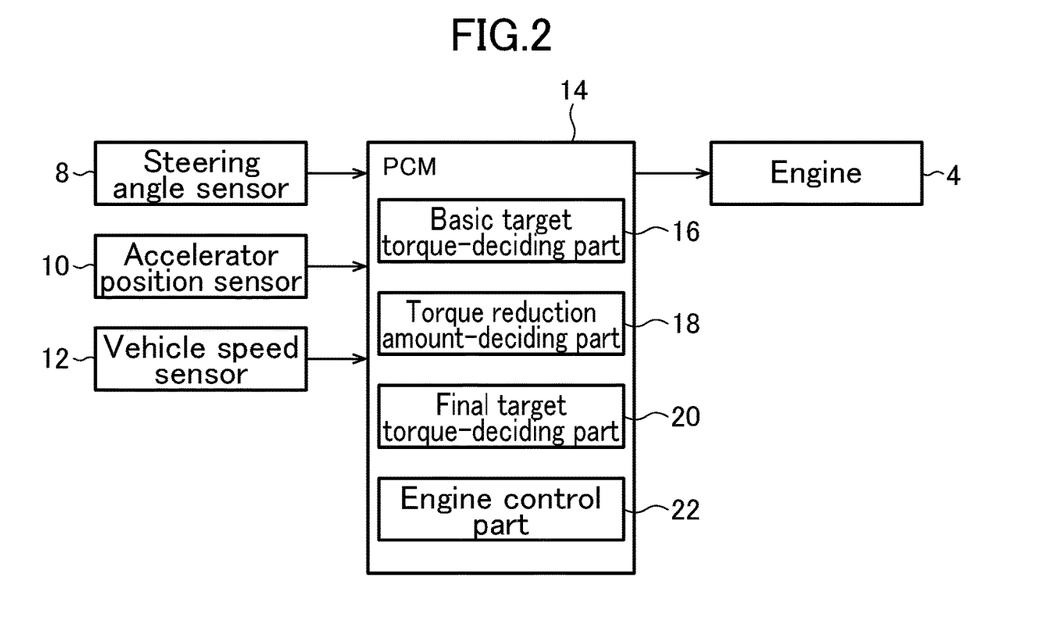
FIG. 2 is a block diagram depicting an electrical configuration of the vehicle behavior control device according to this embodiment.

Next, with reference to FIG. 2, an electrical configuration of the vehicle behavior control device according to this embodiment will be described. FIG. 2 is a block diagram depicting the electrical configuration of the vehicle behavior control device according to this embodiment.

The PCM 14 (vehicle behavior control device) according to this embodiment is configured to, based on detection signals output from the above sensors 8 to 12, and detection signals output from various other sensors for detecting an operating state of the engine 4, generate and output control signals to perform controls with respect to various components (e.g., a throttle valve, a turbocharger, a variable valve mechanism, an ignition unit, a fuel injection valve, and an EGR unit) of the engine 4.

The PCM 14 comprises: a basic target torque-deciding part 16 for deciding a basic target torque based on a driving state of the vehicle 1 including an accelerator pedal operation; a torque reduction amount-deciding part 18 for deciding a torque reduction amount for adding a deceleration to the vehicle 1 based on a yaw rate-related quantity of the vehicle 1; a final target torque-deciding part 20 for deciding a final target torque based on the basic target torque and the torque reduction amount; and an engine control part 22 for controlling the engine 4 to cause the engine 4 to output the final target torque. This embodiment will be described based on an example where steering speed of the vehicle 1 is used as the yaw rate-related quantity.

The above components of the PCM 14 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

The PCM 14 is one example of the "vehicle behavior control device" of the present invention. Specifically, the torque reduction amount-deciding part 18, the final target torque-deciding part 20 and the engine control part 22 of the PCM 14 are equivalent to "controller" set forth in the appended claims.

Next, with reference to FIGS. 3 to 5, processing to be performed by the vehicle behavior control device will be described.

Figure 3:
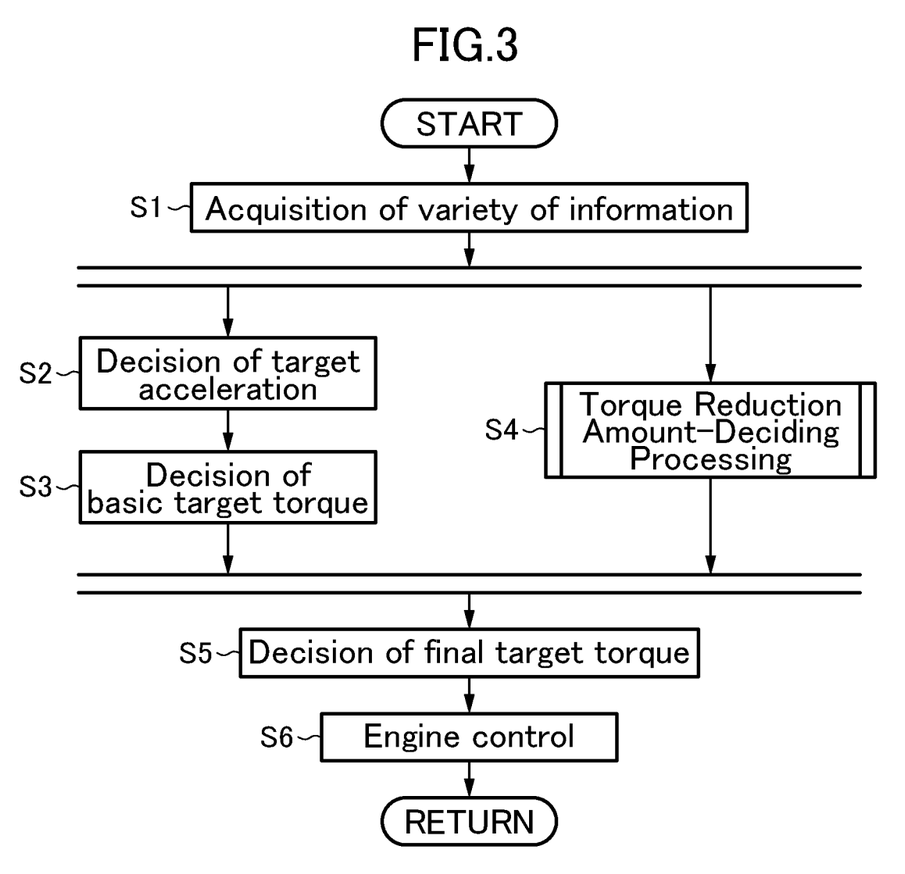
FIG. 3 is a flowchart depicting engine control processing to be performed by the vehicle behavior control device according to this embodiment, so as to control an engine.
Figure 4:
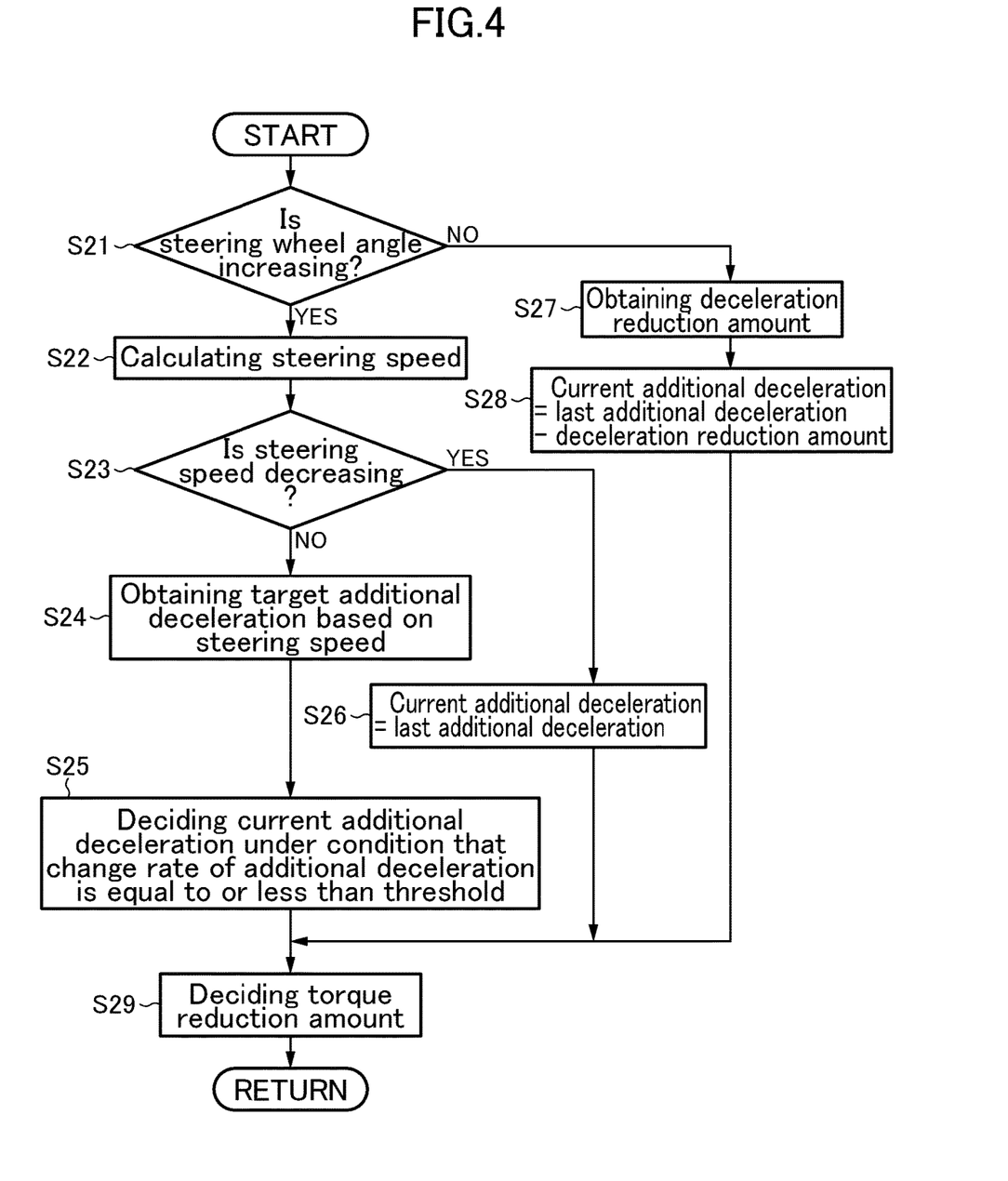
FIG. 4 is a flowchart depicting torque reduction amount-deciding processing to be performed by the vehicle behavior control device according to this embodiment, so as to decide a torque reduction amount.

FIG. 3 is a flowchart depicting engine control processing to be performed by the vehicle behavior control device according to this embodiment, so as to control the engine 4, and FIG. 4 is a flowchart depicting torque reduction amount-deciding processing to be performed by the vehicle behavior control device according to this embodiment, so as to decide the torque reduction amount. FIG. 5 is a map depicting a relationship between the steering speed, and a target additional deceleration to be decided by the vehicle behavior control device according to this embodiment.

The engine control processing in FIG. 3 is activated when an ignition switch of the vehicle 1 is turned on to apply power to the vehicle behavior control device, and repeatedly executed with a given cycle period.

As depicted in FIG. 3, upon start of the engine control processing, in step S1, the PCM 14 operates to acquire a variety of information about the driving state of the vehicle 1. Specifically, the PCM 14 operates to acquire, as information about the driving state, detection signals output from the aforementioned sensors, including the steering wheel angle detected by the steering wheel angle sensor 8, the accelerator position detected by the accelerator position sensor 10, the vehicle speed detected by the vehicle speed sensor 12, and a gear stage currently set in a transmission of the vehicle 1.

Subsequently, in step S2, the basic target torque-deciding part 16 of the PCM 14 operates to set a target acceleration based on the driving state of the vehicle 1 including the accelerator pedal operation, acquired in the step S1. Specifically, the basic target torque-deciding part 16 operates to select, from a plurality of acceleration characteristic maps defined with respect to various vehicle speeds and various gear stages (the maps are preliminarily created and stored in a memory or the like), one acceleration characteristic map corresponding to a current vehicle speed and a current gear stage, and decide a target acceleration corresponding to a current accelerator position, with reference to the selected acceleration characteristic map.

Subsequently, in step S3, the basic target torque-deciding part 16 operates to decide the basic target torque of the engine 4 for realizing the target acceleration decided in the step S2. In this embodiment, the basic target torque-deciding part 16 operates to decide the basic target torque within a torque range outputtable by the engine 4, based on current vehicle speed, gear stage, road grade, road surface mu ($\mu$), etc.

In parallel to the processing in the steps S2 and S3, in step S4, the torque reduction amount-deciding part 18 operates to perform the torque reduction amount-deciding processing of deciding the torque reduction amount for adding a deceleration to the vehicle 1, based on a steering wheel operation. This torque reduction amount-deciding processing will be described with reference to FIG. 4.

As depicted in FIG. 4, upon start of the torque reduction amount-deciding processing, in step S21, the torque reduction amount-deciding part 18 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding part 18 operates to calculate the steering speed as the yaw rate-related quantity, based on the steering wheel angle acquired in the step S1.

Subsequently, in step S23, the torque reduction amount-deciding part 18 operates to determine whether an absolute value of the calculated steering speed is decreasing. As a result, when the absolute value of the calculated steering speed is not decreasing, i.e., the absolute value of the calculated steering speed is increasing or the absolute value of the steering speed does not change, the subroutine proceeds to step S24. In the step S24, the torque reduction amount-deciding part 18 operates to obtain the target additional deceleration based on the calculated steering speed. This target additional deceleration is a deceleration to be added to the vehicle 1 according to the steering wheel operation in order to accurately realize a vehicle behavior which is intended by a driver.

Figure 5:
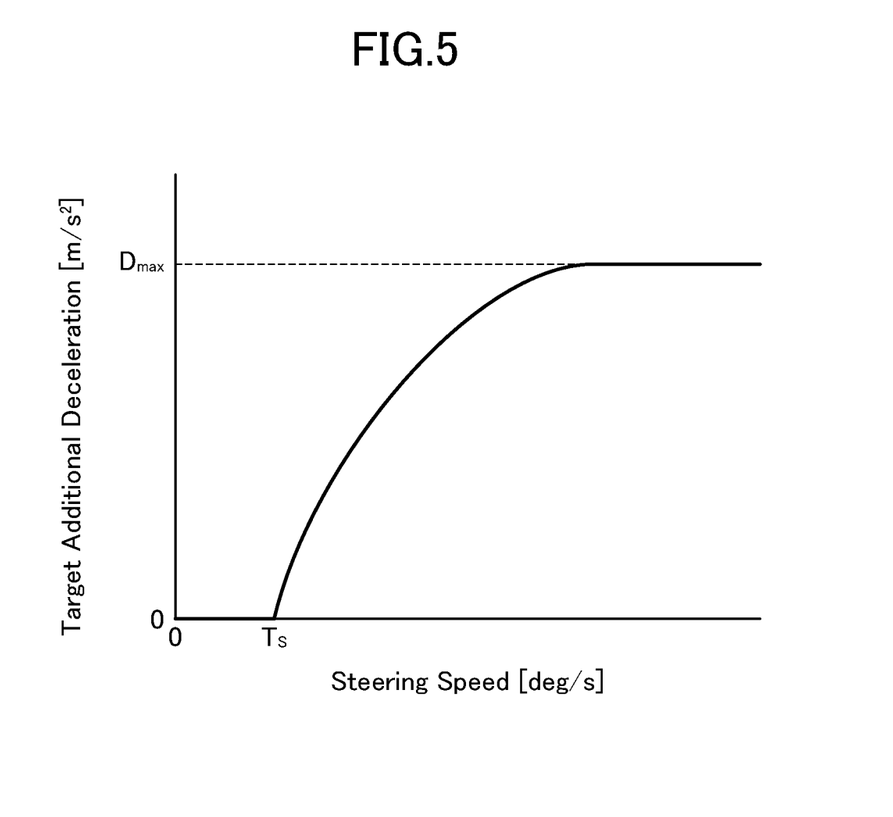
FIG. 5 is a map depicting a relationship between a steering speed, and a target additional deceleration to be decided by the vehicle behavior control device according to this embodiment.

Specifically, the torque reduction amount-deciding part 18 operates to obtain a value of the target additional deceleration corresponding to the steering speed calculated in the step S22, based on a relationship between the target additional deceleration and the steering speed, represented by the map in FIG. 5.

In FIG. 5, the horizontal axis denotes the steering speed, and the vertical axis denotes the target additional deceleration. As depicted in FIG. 5, when the steering speed is equal to or less than a threshold $T_S$, a corresponding value of the target additional deceleration is 0. That is, when the steering speed is equal to or less than the threshold $T_S$, the PCM 14 operates to stop control of adding a deceleration to the vehicle 1 (specifically, reduce an output torque of the engine 4) based on the steering wheel operation.

On the other hand, when the steering speed is greater than the threshold $T_S$, as the steering speed is increased to a higher value, a value of the target additional deceleration corresponding to the steering speed comes closer to a given upper limit value $D_{max}$ (e.g., 1 m/s$^2$). That is, as the steering speed is increased to a higher value, the target additional deceleration is increased to a larger value, and a rate of increase of the target additional deceleration becomes smaller.

Subsequently, in step S25, the torque reduction amount-deciding part 18 operates to decide an additional deceleration in the current processing cycle, under a condition that an increase rate of the additional deceleration is equal to or less than a threshold $R_{max}$ (e.g., 0.5 m/s$^3$).

Specifically, the torque reduction amount-deciding part 18 operates to, when an increase rate from a value of the additional deceleration decided in the last processing cycle to a value of the target additional deceleration obtained in the step S24 in the current processing cycle is equal to or less than the threshold $R_{max}$, decide the value of the target additional deceleration obtained in the step S24, as a value of the additional deceleration in the current processing cycle.

On the other hand, the torque reduction amount-deciding part 18 operates to, when the increase rate from the value of the additional deceleration decided in the last processing cycle to the value of the target additional deceleration obtained in the step S24 in the current processing cycle is greater than the threshold $R_{max}$, decide, as the value of the additional deceleration in the current processing cycle, a value obtained by increasing the value of the additional deceleration decided in the last processing cycle, at the increase rate $R_{max}$ for the given cycle period.

Referring to the step S23 again, when the absolute value of the steering speed is decreasing, the subroutine proceeds to step S26. In the step S26, the torque reduction amount-deciding part 18 operates to decide the value of the additional deceleration decided in the last processing cycle, as the value of the additional deceleration in the current processing cycle. That is, when the absolute value of the steering speed is decreasing, a value of the additional deceleration corresponding to a maximum value of the steering speed (i.e., a maximum value of the additional deceleration) is maintained.

Referring to the step S21 again, when the absolute value of the steering wheel angle is not increasing, i.e., the absolute value of the steering wheel angle is maintained constant or is decreasing, the subroutine proceeds to step S27. In the step S27, the torque reduction amount-deciding part 18 operates to obtain an amount (deceleration reduction amount) by which the value of the additional deceleration decided in the last processing cycle is to be reduced in the current processing cycle.

In particular, when the absolute value of the steering wheel angle is decreasing, the torque reduction amount-deciding part 18 operates to decide the deceleration reduction amount based on the steering speed calculated in the step S22. In this case, the torque reduction amount-deciding part 18 operates to decide the deceleration reduction amount to allow a change rate of the additional deceleration during control of reducing the additional deceleration (i.e., a change rate of a torque (driving force) to be applied to the vehicle 1, during control of increasing the torque) to become smaller along with a decrease in the steering speed. The torque reduction amount-deciding part 18 also operates to decide the deceleration reduction amount to allow the change rate of the additional deceleration during the control of reducing the additional deceleration to fall within a given range. An upper limit defining the given range (maximum value of the change rate) is set from a viewpoint, for example, of ensuring combustion stability and exhaust gas emission performance of the engine 4, or the like, and a lower limit defining the given range (minimum value of the change rate) is set from a viewpoint, for example, of drivability or the like. In one example, a map defining a change rate of the additional deceleration to be set according to each steering speed may be preliminarily created, and the torque reduction amount-deciding part 18 may be configured to refer to the map, and decide the deceleration reduction amount, based on a change rate of the additional deceleration extracted from the map according to the steering speed.

In another example, when the steering speed is equal to or greater than a given value, the deceleration reduction amount may be decided to allow the change rate of the additional deceleration to become a constant value (e.g., 0.3 m/s³), and only when the steering speed is less than the given value, the deceleration reduction amount may be decided to allow the change rate of the additional deceleration to be changed according to the steering speed (to be changed to a value less than at least the above constant value of the change rate). More specifically, in this example, when the steering speed is less than the given value, the deceleration reduction amount may be decided to allow the change rate of the additional deceleration to become smaller along with a decrease in the steering speed, or may be decided to allow the change rate of the additional deceleration to have a fixed value (a value less than the constant value of the change rate to be applied to the case where the steering speed is equal to or greater than the given value), irrespective of the steering speed (appropriate to such a low steering speed).

Subsequently, in step S28, the torque reduction amount-deciding part 18 operates to subtract a value of the deceleration reduction amount obtained in the step S27 from the value of the additional deceleration decided in the last processing cycle, to thereby decide the additional deceleration in the current processing cycle.

After completion of the step S25, S26 or S28, in step S29, the torque reduction amount-deciding part 18 operates to decide the torque reduction amount, based on the current additional deceleration decided in the step S25, S26 or S28. Specifically, the torque reduction amount-deciding part 18 operates to decide a value of the torque reduction amount required for realizing the current additional deceleration, based on the current vehicle speed, gear stage, road gradient and others acquired in the Step S1. After completion of the step S29, the torque reduction amount-deciding part 18 operates to terminate the torque reduction amount-deciding processing, and the engine control processing routine returns to the main routine.

Returning to FIG. 3, after performing the processing in the steps S2 and S3 and the torque reduction amount-deciding processing in the step S4, in step S5, the final target torque-deciding part 20 operates to subtract a value of the torque reduction amount decided by the torque reduction amount-deciding processing in the step S4, from a value of a basic target torque after being subjected to smoothing in the step S3, to thereby decide the final target torque.

Subsequently, in step S6, the engine control part 22 operates to control the engine 4 to cause the engine 4 to output the final target torque set in the step S5. Specifically, the engine control part 22 operates to, based on the final target torque set in the step S5 and an engine speed, decide various engine state amounts (e.g., air charge amount, fuel injection amount, intake-air temperature, and oxygen concentration) required for realizing the final target torque set in the step S5, and then, based on the decided state amounts, control a plurality of actuators for driving various components of the engine 4. In this case, the engine control part 22 operates to perform engine control in such a manner as to set a limit value or range with respect to each of the state amounts, and set a controlled variable of each actuator to allow its related state amount to preserve limitation by the limit value or range.

After completion of the step S6, the PCM 14 operates to terminate the engine control processing.

Next, with reference to FIGS. 6A to 6G, an operation of the vehicle behavior control device according to this embodiment will be described. FIGS. 6A to 6G are diagrams depicting a temporal change of each parameter pertaining to the engine control to be performed by the vehicle behavior control device according to this embodiment during turning of the vehicle 1 equipped with the vehicle behavior control device.

Figure 6A:
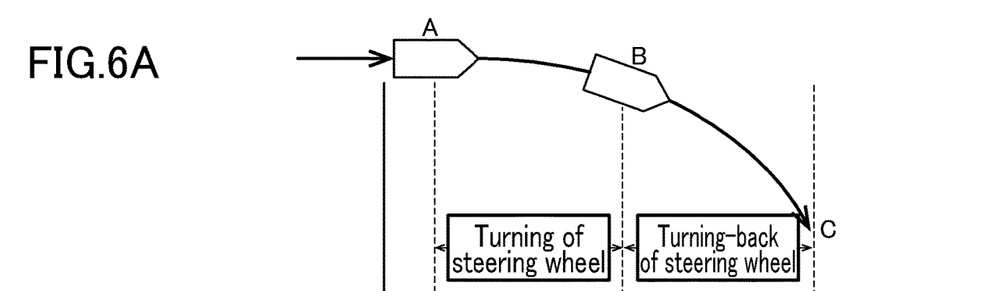
FIG. 6A is a top plan view schematically depicting the vehicle which is turning in a clockwise direction.

FIG. 6A is a top plan view schematically depicting the vehicle 1 which is turning in a clockwise direction. As depicted in FIG. 6A, the vehicle 1 turns from a position A to a position C via a position B, in the clockwise direction.

Figure 6B:
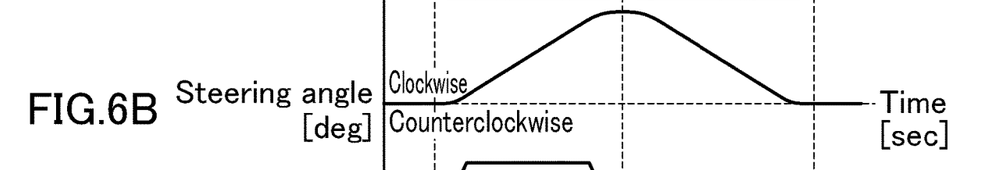
FIG. 6B is a diagram depicting a change in steering wheel angle of the vehicle which is turning in the clockwise direction as depicted in FIG. 6A.

FIG. 6B is a diagram depicting a change in steering wheel angle of the vehicle 1 which is turning in the clockwise direction as depicted in FIG. 6A. In FIG. 6B, the horizontal axis represents the time, and the vertical axis represents the steering wheel angle (the angle in the clockwise direction has a positive value).

As depicted in FIG. 6B, clockwise steering is started at the position A, and then, along with an additional turning operation of the steering wheel, a clockwise steering wheel angle gradually increases and reaches a maximum value at the position B. Subsequently, along with a turning-back operation of the steering wheel, the clockwise steering wheel angle gradually decreases and becomes zero at the position C.

Figure 6C:
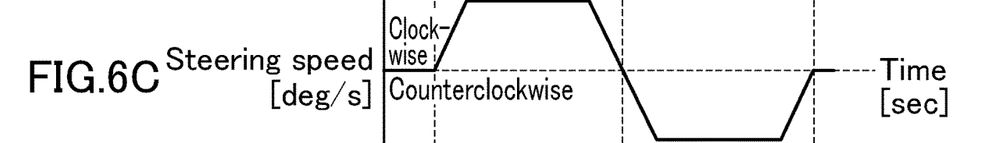
FIG. 6C is a diagram depicting a change in steering speed of the vehicle which is turning in the clockwise direction as depicted in FIG. 6A.

FIG. 6C is a diagram depicting a change in steering speed of the vehicle 1 which is turning in the clockwise direction as depicted in FIG. 6A. In FIG. 6C, the horizontal axis represents the time, and the vertical axis represents the steering speed. The steering speed of the vehicle 1 is expressed as a temporal differentiation of the steering wheel angle of the vehicle 1. That is, as depicted in FIG. 6C, when clockwise steering is started at the position A, a clockwise steering speed arises and is maintained approximately constant in an intermediate zone between the position A and the position B. Then, when the clockwise steering speed deceases and the clockwise steering wheel angle reaches the maximum value at the position B, the steering speed becomes 0. After this, counterclockwise (turning-back) steering is started, and a counterclockwise steering speed arises and is maintained approximately constant in an intermediate zone between the position B and the position C. Then, the counterclockwise steering speed deceases, and, at the position C, each of the clockwise steering wheel angle and the counterclockwise steering speed becomes 0.

Figure 6D:
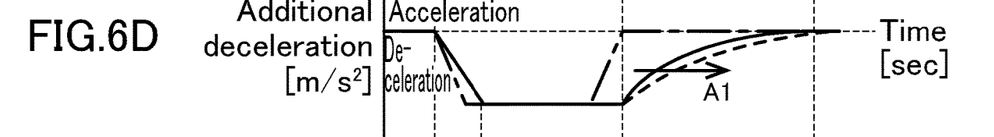
FIG. 6D is a diagram depicting a change in additional deceleration decided based on the steering speed depicted in FIG. 6C.

FIG. 6D is a diagram depicting a change in the additional deceleration decided based on the steering speed depicted in FIG. 6C. In FIG. 6D, the horizontal axis represents the time, and the vertical axis represents the additional deceleration. In FIG. 6D, the solid line indicates a change in the additional deceleration decided in the torque reduction amount-deciding processing in FIG. 4, and the one-dot chain line indicates a change in the target additional deceleration based on the steering speed. As with the change in the steering speed depicted in FIG. 6C, the target additional deceleration indicated by the one-dot chain line starts increasing from the position A, and is maintained approximately constant in an intermediate zone between the position A and the position B, whereafter it decreases, and becomes 0 at the position B.

As described with reference to FIG. 4, when the steering wheel angle is determined in the step S21 to be increasing, and the absolute value of the steering speed is determined in the step S23 to be not decreasing, i.e., to be increasing or to have no change, the torque reduction amount-deciding part 18 operates in the step S24 to obtain the target additional deceleration based on the steering speed. Subsequently, in the step S25, the torque reduction amount-deciding part 18 operates to decide the additional deceleration in each processing cycle, under the condition that the increase rate of the additional deceleration is equal to or less than the threshold $R_{max}$.

FIG. 6D depicts a case where an increase rate of the target additional deceleration starting increasing from the position A is greater than the threshold $R_{max}$. In this case, the torque reduction amount-deciding part 18 operates to increase the last additional deceleration at an increase rate equal to the threshold $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-deciding part 18 operates to decide that the additional deceleration is equal to the target additional deceleration.

Then, when the absolute value of the steering speed is determined, in the step S23 depicted in FIG. 4, to be decreasing, the torque reduction amount-deciding part 18 operates to maintain the additional deceleration at the maximum steering speed, as mentioned above. Specifically, in FIG. 6D, when the steering speed decreases toward the position B, the target additional deceleration indicated by the one-dot chain line also decreases along therewith, but the additional deceleration indicated by the solid line is maintained at its maximum value, until the vehicle 1 reaches the position B.

On the other hand, when the absolute value of the steering speed is determined, in the step S21 depicted in FIG. 4, to be maintained constant or to be decreasing (in the example depicted in FIG. 4, the absolute value of the steering speed is decreasing), the torque reduction amount-deciding part 18 operates to obtain the deceleration reduction amount in the step S27, and reduce the last additional deceleration by the deceleration reduction amount, as mentioned above. Specifically, the torque reduction amount-deciding part 18 operates to obtain a change rate of the additional deceleration according to the steering speed at a time when the turning-back operation of the steering wheel is performed (i.e., each steering speed after the position B), for example, by referring to a map defining a change rate of the additional deceleration to be set according to each steering speed, and reduce the last additional deceleration by the obtained change rate. In one example, in the middle of the turning-back operation, the torque reduction amount-deciding part 18 operates to reduce the last additional deceleration based on the steering speed in the intermediate zone in which the steering speed is maintained approximately constant.

In particular, the torque reduction amount-deciding part 18 operates to allow the change rate (rising rate or speed) of the additional deceleration to become smaller, i.e., allow the solid line to be shifted in a direction indicated by the arrowed line A1 in FIG. 6D, as the turning-back operation is performed at a slower steering speed. This makes it possible to suppress the occurrence of a situation where a driver is given a feeling of discontinuous change in reaction force to the steering wheel, when the steering speed during the turning-back operation of the steering wheel is relatively slow (more specifically, the steering speed during the turning-back operation of the steering wheel is relatively slow with respect to the rising speed of the additional deceleration). Further, as depicted in FIG. 6D, the torque reduction amount-deciding part 18 operates to reduce the last additional deceleration to cause the change rate of the additional deceleration to become gradually smaller, i.e., to cause a slope of the solid line indicative of a change in the additional deceleration to become gradually gentler.

Figure 6E:
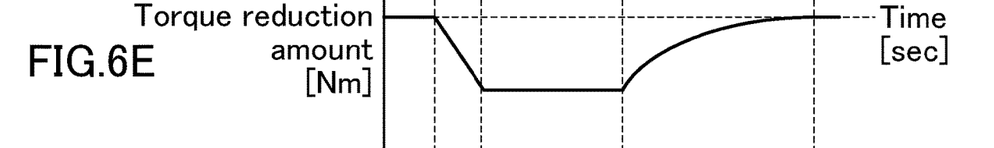
FIG. 6E is a diagram depicting a change in torque reduction amount decided based on the additional deceleration depicted in FIG. 6D.
Figure 6F:
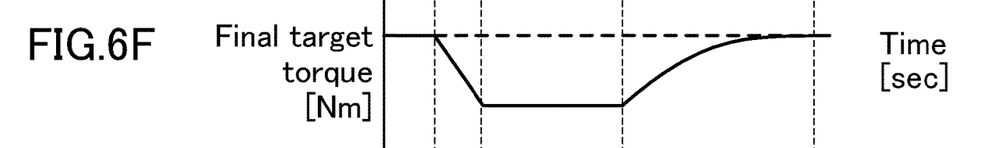
FIG. 6F is a diagram depicting a change in final target torque decided based on a basic target torque and the torque reduction amount.

It is to be understood that, in the case where the change rate of the additional deceleration is set to become smaller (see the arrowed line A1) along with a decrease in the steering speed as mentioned above, a change rate of the torque reduction amount as depicted in FIG. 6E becomes smaller, and thus a change rate of the final target torque as depicted in FIG. 6F becomes smaller.

FIG. 6E is a diagram depicting a change in the torque reduction amount decided based on the additional deceleration depicted in FIG. 6D. In FIG. 6E, the horizontal axis represents the time, and the vertical axis represents the torque reduction amount.

As mentioned above, the torque reduction amount-deciding part 18 operates to decide a value of the torque reduction amount required for realizing an additional deceleration, based on the current vehicle speed, gear stage, road gradient and others. Thus, in the case where respective values of these parameters are constant, the torque reduction amount is decided such that it changes in the same pattern as that of the additional deceleration depicted in FIG. 6D.

FIG. 6F is a diagram depicting a change in the final target torque decided based on the basic target torque and the torque reduction amount. In FIG. 6F, the horizontal axis represents the time, and the vertical axis represents the torque. In FIG. 6F, the dotted line indicates the basic target torque, and the solid line indicates the final target torque.

As described with reference to FIG. 3, the final target torque-deciding part 20 operates to subtract the value of the torque reduction amount decided by the torque reduction amount-deciding processing in the step S4, from the value of the basic target torque decided in the step S3, to thereby decide the final target torque.

Figure 6G:
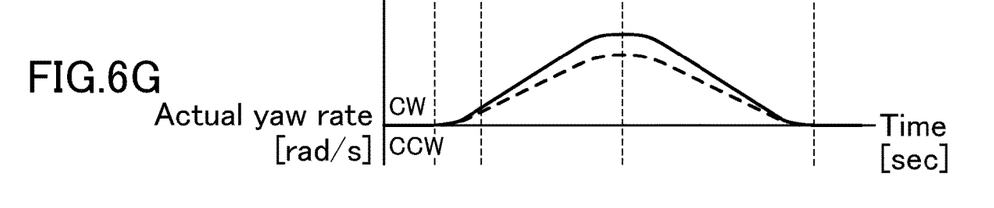
FIG. 6G is a diagram depicting a change in yaw rate (actual yaw rate) generated in the vehicle when the engine control is performed based on the final target torque depicted in FIG. 6F, and a change in actual yaw rate generated in the vehicle when the engine control based on the torque reduction amount decided by a torque reduction amount-deciding part is not performed.

FIG. 6G is a diagram depicting a change in yaw rate (actual yaw rate) generated in the vehicle 1 when control of the engine 4 is performed based on the final target torque depicted in FIG. 6F, and a change in actual yaw rate generated in the vehicle 1 when the control of the engine 4 based on the torque reduction amount decided by the torque reduction amount-deciding part is not performed (i.e., the control of the engine 4 is performed so as to realize the basic target torque indicated by the dotted line in FIG. 6F). In FIG. 6G, the horizontal axis represents the time, and the vertical axis represents the yaw rate. Further, in FIG. 6G, the solid line indicates a change in the yaw rate (actual yaw rate) generated when the control of the engine 4 is performed so as to realize the final target torque, and the dotted line indicates a change in the actual yaw rate generated when the control compatible with the torque reduction amount is not performed.

When clockwise steering is started at the position A, and the torque reduction amount is increased along with an increase in the clockwise steering speed, as depicted in FIG. 6E, a load applied to the front road wheels 2 as steerable road wheels of the vehicle 1 is increased. As a result, a frictional force between each of the front road wheels 2 and a road surface is increased and thus a cornering force of the front road wheels 2 is increased, thereby providing an improved turn-in ability of the vehicle 1. That is, as depicted in FIG. 6G, when the control of the engine 4 is performed in the intermediate zone between the position A and the position B so as to realize the final target torque reflecting the torque reduction amount (solid line), a larger clockwise (CW) yaw rate is generated in the vehicle, as compared to the case where the control compatible with the torque reduction amount is not performed (dotted line).

Then, as depicted in FIGS. 6D and 6E, although the target additional deceleration decreases along with a decrease in the steering speed toward the position B, the load applied to the front road wheels is maintained as long as the tuning of the steering wheel is continued, because the torque reduction amount is maintained at its maximum value. Thus, it becomes possible to maintain the turn-in ability of the vehicle 1.

Then, when the absolute value of the steering wheel angle decreases during traveling from the position B to the position C, the torque reduction amount is smoothly reduced. Thus, in response to completion of the turning of the steering wheel, the load applied to the front road wheels 2 can be gradually reduced to gradually reduce the cornering force of the front road wheels 2, thereby restoring the output torque of the engine 4, while stabilizing a vehicle body.

Next, functions/advantageous effects of the vehicle behavior control device according to this embodiment will be described.

In this embodiment, in response to a change in the steering speed and according to the steering speed being changing, the driving force (torque) for the vehicle is reduced. Then, when the driving force is increased so as to restore a value of the driving force before the reduction, the change rate during the increasing of the driving force is changed according to a magnitude of the steering speed thereduring. According to this feature, during the control of stopping of the reduction of the driving force and increasing the driving force so as to restore an original value of the driving force, the driving force can be increased at an adequate change rate according to the steering speed, so that it becomes possible to suppress the occurrence of a situation where a driver is given a feeling that a reaction force to a steering wheel discontinuously changes during steering. Particularly, in this embodiment, the change rate during the increasing of the driving force is reduced to a smaller value as the steering speed becomes lower (slower), so that it becomes possible to, even when the steering speed is relatively small, effectively suppress the occurrence of the situation where a driver is given a feeling that a reaction force to a steering wheel changes during steering.

In this embodiment, when a steering wheel of the vehicle is turned and then turned back, the change rate during the increasing of the driving force is changed according to a magnitude of the steering speed during the turning-back of the steering wheel, so that it becomes possible to effectively suppress the occurrence of a situation where a driver is given a feeling that a reaction force to the steering wheel changes during the turning-back of the steering wheel.

In this embodiment, the change rate of the driving force during the control of, after reducing the driving force according to the steering speed, increasing the driving force is changed within a given range, so that it becomes possible to ensure combustion stability and exhaust gas emission performance of the engine 4, and ensure drivability.

Although the above embodiment has been described based on an example in which the torque reduction amount-deciding part 18 is configured to obtain the target additional deceleration based on the steering speed as the yaw rate-related quantity, and decide the torque reduction amount based on the obtained target additional deceleration, the torque reduction amount-deciding part 18 may be configured to decide the torque reduction amount based on any driving state of the vehicle 1 other than the accelerator pedal operation (e.g., steering wheel angle, yaw rate, or slip ratio).

For example, the torque reduction amount-deciding part 18 may be configured to calculate, as the yaw rate-related quantity, a target yaw acceleration to be generated in the vehicle 1, based on a target yaw rate calculated from the steering wheel angle and the vehicle speed, and a yaw rate input from a yaw rate sensor, and obtain the target additional deceleration based on the calculated target yaw acceleration to decide the torque reduction amount. Alternatively, it is also possible to detect, by an acceleration sensor, a lateral acceleration to be generated in the vehicle 1 along with turning of the vehicle 1, as the yaw rate-related quantity, and decide the torque reduction amount based on the detected lateral acceleration.

The above embodiment has been described based on an example in which the vehicle 1 equipped with the vehicle behavior control device has the engine 4 for driving drive road wheels. However, the vehicle behavior control device of the present invention may also be applied to a vehicle having a motor for driving the drive road wheels by electric power supplied from a battery or a capacitor. In this case, the PCM 14 may be configured to perform control to reduce a torque of the motor according to the steering speed of the vehicle 1.

What is claimed is:

1. A vehicle behavior control device for controlling a behavior of a vehicle having steerable front road wheels, comprising
a controller configured to perform a control to reduce a driving force from an engine to a plurality of wheels from a basic torque determined based on an accelerator pedal operation, the reduction based on a driving force reduction amount according to a steering speed of a steering wheel operated by a driver,
wherein the controller is configured to:
increase the driving force toward the basic torque after the steering speed is reduced by a predetermined non-zero amount, after the driving force is reduced in response to a change in the steering speed according to the steering speed being changed; and
change a change rate of the driving force during the increasing of the driving force according to a magnitude of the steering speed during the increasing of the driving force, when the driving force is increased so as to restore the value of the driving force before the reduction.

2. The vehicle behavior control device according to claim 1, wherein the controller is configured to reduce the change rate during the increasing of the driving force, as the steering speed decreases.

3. The vehicle behavior control device according to claim 1, wherein, when a steering wheel of the vehicle is turned and then turned back, the controller is configured to change the change rate during the increasing of the driving force, according to a magnitude of the steering speed during the turning-back of the steering wheel.

4. The vehicle behavior control device according to claim 1, wherein the controller is configured to change the change rate within a predetermined range, during the increasing of the driving force.

5. The vehicle behavior control device according to claim 1,
wherein, when a steering wheel angle is increasing and the steering speed is increasing, the controller is configured to reduce the driving force according to the steering speed increasing, and
wherein, when the steering wheel angle decreases or becomes constant, the controller is configured to increase the driving force so as to restore a value of the driving force before the reduction.

6. The vehicle behavior control device according to claim 1, wherein the plurality of wheels includes the steerable front road wheels.

7. A vehicle behavior control device for controlling a behavior of a vehicle having steerable front road wheels, comprising
a controller configured to perform a control to reduce a driving force output from an engine to a plurality of wheels according to a steering speed of a steering wheel operated by a driver when the controller determines that a steering wheel angle is increasing,
wherein the controller is configured to:
increase the driving force from the engine after the steering speed is reduced by a predetermined non-zero amount so as to restore a value of the driving force from the engine before the reduction when the controller determines that a steering wheel angle is reducing or maintained constant, after the driving force from the engine is reduced in response to a change in the steering speed according to the steering speed being changed; and
change a change rate of the driving force during the increasing of the driving force from the engine according to a magnitude of the steering speed during the increasing of the driving force, when the driving force from the engine is increased so as to restore the value of the driving force from the engine before the reduction.

8. The vehicle behavior control device according to claim 7, wherein the plurality of wheels includes the steerable front road wheels.

* * * * *